United States Patent
Zhang et al.

(10) Patent No.: US 10,190,422 B2
(45) Date of Patent: Jan. 29, 2019

(54) ROTATION ENHANCED TURBINE BLADE COOLING

(71) Applicant: Solar Turbines Incorporated, San Diego, CA (US)

(72) Inventors: Luzeng Zhang, San Diego, CA (US); Juan Yin, San Diego, CA (US); Hee Koo Moon, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 373 days.

(21) Appl. No.: 15/096,854

(22) Filed: Apr. 12, 2016

(65) Prior Publication Data

US 2017/0292385 A1    Oct. 12, 2017

(51) Int. Cl.
*F01D 5/18* (2006.01)
*F01D 5/14* (2006.01)
*F02C 7/12* (2006.01)
*F02C 3/04* (2006.01)

(52) U.S. Cl.
CPC .......... *F01D 5/187* (2013.01); *F01D 5/147* (2013.01); *F02C 3/04* (2013.01); *F02C 7/12* (2013.01); *F05D 2220/32* (2013.01); *F05D 2240/35* (2013.01); *F05D 2260/202* (2013.01)

(58) Field of Classification Search
CPC .......... F02C 3/04; F02C 7/12; F05D 2220/32; F01D 5/187; F01D 5/147
See application file for complete search history.

(56) References Cited

U.S. PATENT DOCUMENTS

| | | | | |
|---|---|---|---|---|
| 5,165,852 A | * | 11/1992 | Lee | F01D 5/187 416/95 |
| 5,356,265 A | * | 10/1994 | Kercher | F01D 5/186 416/97 R |
| 5,538,394 A | * | 7/1996 | Inomata | F01D 5/187 415/115 |
| 5,660,524 A | | 8/1997 | Lee et al. | |
| 6,382,908 B1 | | 5/2002 | Keith et al. | |

(Continued)

*Primary Examiner* — Carlos A Rivera
(74) *Attorney, Agent, or Firm* — Finnegan, Henderson, Farabow, Garrett & Dunner, LLP (57) ABSTRACT

A turbine blade for a gas turbine engine may include an outer, peripheral wall extending along a suction side and a pressure side of the blade from a leading edge to a trailing edge of the blade and from a root end to a tip end of the blade, a substantially vertical bifurcating internal wall extending between the leading edge and the trailing edge of the blade in between the suction side and the pressure side of the blade, a plurality of pressure side cooling fluid passages defined between the peripheral wall on the pressure side of the blade and the bifurcating internal wall and extending at least part way from the root end to the tip end of the blade, and a plurality of suction side cooling fluid passages defined between the peripheral wall on the suction side of the blade and the bifurcating internal wall and extending at least part way from the tip end to the root end of the blade. At least one of the pressure side cooling fluid passages may receive fresh cooling fluid from a cooling fluid inlet opening at the root end of the blade and direct the cooling fluid radially upwardly toward the tip end of the blade, across a top side of the bifurcating internal wall, and down through at least one of the plurality of suction side cooling fluid passages.

4 Claims, 4 Drawing Sheets

(56) References Cited

U.S. PATENT DOCUMENTS

| | | | |
|---|---|---|---|
| 6,916,155 B2* | 7/2005 | Eneau | F01D 5/186 |
| | | | 415/115 |
| 6,926,499 B2 | 8/2005 | Yamawaki et al. | |
| 7,296,973 B2* | 11/2007 | Lee | F01D 5/187 |
| | | | 416/97 R |
| 7,413,407 B2* | 8/2008 | Liang | F01D 5/186 |
| | | | 416/97 R |
| 7,665,962 B1 | 2/2010 | Liang | |
| 7,674,093 B2* | 3/2010 | Lee | B22C 9/103 |
| | | | 164/365 |
| 7,967,566 B2* | 6/2011 | Liang | F01D 5/187 |
| | | | 416/97 R |
| 8,186,953 B1 | 5/2012 | Kimmel | |
| 8,585,351 B2 | 11/2013 | Bregman et al. | |
| 8,807,943 B1 | 8/2014 | Liang | |
| 8,944,763 B2* | 2/2015 | Lee | F01D 5/087 |
| | | | 416/97 R |
| 9,062,555 B2 | 6/2015 | Schnieder et al. | |
| 2009/0060715 A1* | 3/2009 | Kopmels | F01D 5/187 |
| | | | 415/115 |
| 2014/0086724 A1* | 3/2014 | Tibbott | F01D 5/187 |
| | | | 415/1 |
| 2018/0051576 A1* | 2/2018 | Weber | F01D 5/187 |

* cited by examiner

ROTATION ENHANCED TURBINE BLADE COOLING

TECHNICAL FIELD

The present disclosure relates generally to turbine blade cooling, and more particularly to rotation enhanced turbine blade cooling.

BACKGROUND

Gas turbine engines (GTEs) produce power by extracting energy from a flow of hot gas produced by combustion of fuel in a stream of compressed air. In general, turbine engines have an upstream air compressor coupled to a downstream turbine with a combustion chamber ("combustor") in between. Energy is released when a mixture of compressed air and fuel is burned in the combustor. In a typical turbine engine, one or more fuel injectors direct a liquid or gaseous hydrocarbon fuel into the combustor for combustion. The resulting hot gases are directed over blades of the turbine to spin the turbine and produce mechanical power. The engine efficiency can be increased by passing a higher temperature gas into the turbine. However, material properties and cooling limitations limit the turbine inlet temperature.

High performance GTEs include cooling passages and cooling fluid to improve reliability and cycle life of individual components within the GTE. For example, in cooling the turbine section, cooling passages are provided within the turbine blades to direct a cooling fluid therethrough. Conventionally, a portion of the compressed air is bled from the air compressor to cool components such as the turbine blades. The amount of air bled from the air compressor, however, is limited so that a sufficient amount of compressed air is available for engine combustion to perform useful work.

U.S. Pat. No. 8,585,351 to Bregman et al. (the '351 patent) describes a gas turbine blade having a cooling air channel extending from an air inlet opening in the root throughout the airfoil to a plurality of air outlets at the pressure side and the leading edge of the top of the tip of the airfoil. The concentration of air outlets at the top of the tip of the airfoil is higher on the pressure side than on the suction side. The '351 patent also discloses a cooling arrangement with at least two air channel systems. According to the '351 patent, the difference in concentration of air outlets in different regions of the blade, and the use of two air channel systems results in the cooling fluid being lead more precisely to the parts of the tip where the most heat is generated during operation of the blade. However, centrifugal forces and air flow at boundary layers may still prevent some areas of the turbine blade from being adequately cooled.

The present disclosure is directed to overcoming one or more of the shortcomings set forth above.

SUMMARY

In one aspect, a turbine blade for a gas turbine engine is disclosed. The turbine blade may include an outer, peripheral wall extending along a suction side and a pressure side of the blade from a leading edge to a trailing edge of the blade and from a root end to a tip end of the blade. The blade may also include a substantially vertical bifurcating internal wall extending between the leading edge and the trailing edge of the blade in between the suction side and the pressure side of the blade. A plurality of pressure side cooling fluid passages may be defined between the peripheral wall on the pressure side of the blade and the bifurcating internal wall and extending at least part way from the root end to the tip end of the blade. A plurality of suction side cooling fluid passages may be defined between the peripheral wall on the suction side of the blade and the bifurcating internal wall and extending at least part way from the tip end to the root end of the blade. At least one of the pressure side cooling fluid passages may be configured to receive fresh cooling fluid from a cooling fluid inlet opening at the root end of the blade and direct the cooling fluid radially upwardly toward the tip end of the blade. The tip end of the at least one of the pressure side cooling fluid passages may be fluidly connected across a top side of the bifurcating internal wall to at least one of the plurality of suction side cooling fluid passages such that cooling fluid passes up through the at least one of the pressure side cooling fluid passages from the root end to the tip end of the blade, across the top of the bifurcating internal wall, and down through the at least one of the suction side cooling passages from the tip end to the root end of the blade.

In another aspect, a method of cooling a turbine blade is disclosed. The turbine blade may include an outer, peripheral wall extending along a suction side and a pressure side of the blade from a leading edge to a trailing edge of the blade and from a root end to a tip end of the blade, a substantially vertical bifurcating internal wall extending between the leading edge and the trailing edge of the blade in between the suction side and the pressure side of the blade, a plurality of pressure side cooling fluid passages defined between the peripheral wall on the pressure side of the blade and the bifurcating internal wall and extending at least part way from the root end to the tip end of the blade, and a plurality of suction side cooling fluid passages defined between the peripheral wall on the suction side of the blade and the bifurcating internal wall and extending at least part way from the tip end to the root end of the blade. The method may include directing cooling fluid from a cooling fluid inlet opening at the root end of the blade up through at least one of the pressure side cooling fluid passages toward the tip end of the blade, directing the cooling fluid across the top of the bifurcating internal wall from the tip end of the at least one pressure side cooling fluid passage to the tip end of at least one suction side cooling fluid passage, and directing the cooling fluid through the at least one suction side cooling fluid passage from the tip end of the blade toward the root end of the blade.

In yet another aspect, a gas turbine engine is disclosed. The gas turbine engine may include a compressor section configured to compress a cooling fluid, one or more combustion chambers configured to receive some of the compressed cooling fluid, and a turbine section configured to receive a portion of the compressed cooling fluid from the compressor section. The turbine section may include a support structure having a fluid flow channel through which the cooling fluid flows, and a rotor assembly, wherein the rotor assembly includes one or more rotor discs, and a plurality of turbine blades being replaceably mounted within each of the one or more rotor discs, and a cooling fluid inlet opening in fluid communication with the fluid flow channel and with a root end of each turbine blade. Each of the plurality of turbine blades may include an outer, peripheral wall extending along a suction side and a pressure side of the blade from a leading edge to a trailing edge of the blade and from a root end to a tip end of the blade, a substantially vertical bifurcating internal wall extending between the leading edge and the trailing edge of the blade in between the suction side and the pressure side of the blade, a plurality of pressure side cooling fluid passages defined between the peripheral wall on the pressure side of the blade and the bifurcating internal wall and extending at least part way from the root end to the tip end of the blade, and a plurality of suction side cooling fluid passages defined between the peripheral wall on the suction side of the blade and the bifurcating internal wall and extending at least part way from the tip end to the root end of the blade. At least one of the pressure side cooling fluid passages may be configured to receive fresh cooling fluid from the cooling fluid inlet opening at the root end of the blade and direct the cooling fluid radially upwardly toward the tip end of the blade, wherein the tip end of the at least one of the pressure side cooling fluid passages is fluidly connected across a top side of the bifurcating internal wall to at least one of the plurality of suction side cooling fluid passages such that cooling fluid passes up through the at least one pressure side cooling fluid passages from the root end to the tip end of the blade, across the top of the bifurcating internal wall, and down through the at least one suction side cooling passage from the tip end to the root end of the blade.

DETAILED DESCRIPTION

Figure 1:
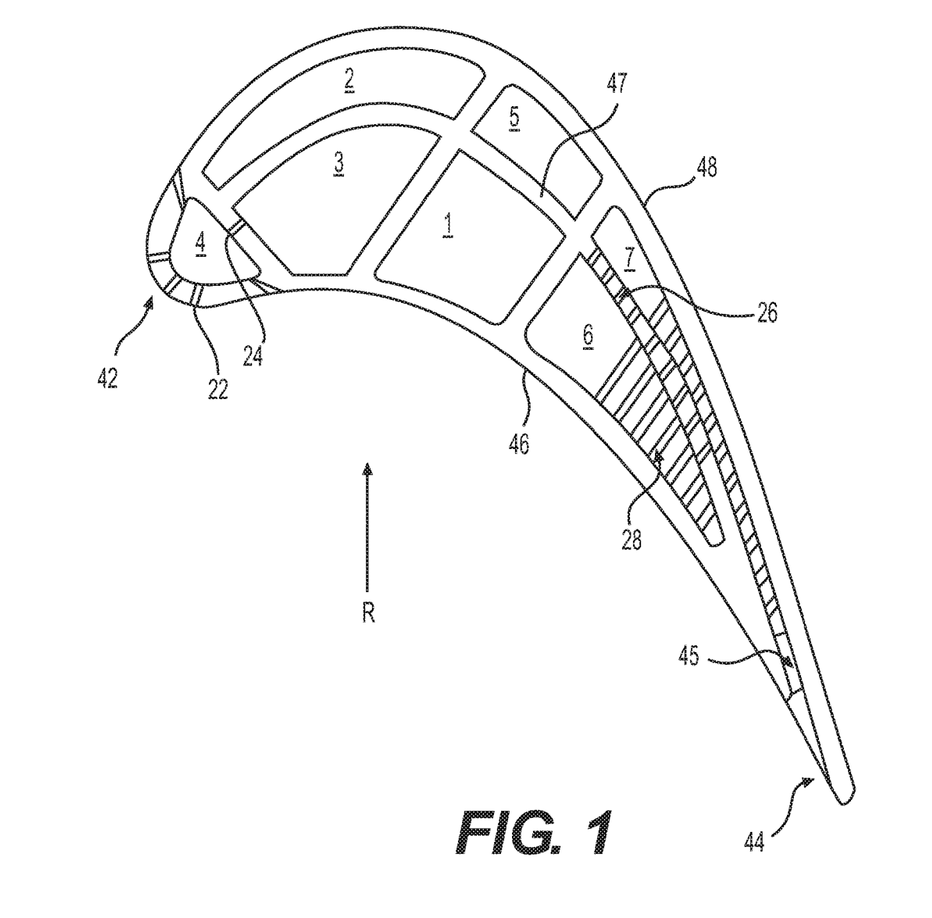
FIG. 1 is a horizontal sectional view of one exemplary embodiment of a turbine blade.

FIG. 1 illustrates a horizontal sectional view of a turbine blade from a GTE. During operation of the GTE, a cooling fluid flows from a compressor section of the GTE to the turbine section. Furthermore, each of the combustion chambers of the GTE may be radially disposed in a spaced apart relationship with respect to each other, and have a space through which the cooling fluid flows to the turbine section. The turbine section further includes a support structure having a fluid flow channel through which the cooling fluid flows. The turbine blades may be made from any appropriate materials, for example metals or ceramics. The turbine blades may be mounted on a rotor assembly of the GTE, with a disc of the rotor assembly having a plurality of circumferentially arranged root retention slots. The turbine blades may be replaceably mounted within the disc. Each of the blades may include a first, root end having a root section extending therefrom which engages with one of the corresponding root retention slots. The first, root end of each blade may be spaced away from a bottom of the root retention slot in the rotor assembly to form a cooling fluid inlet opening configured to receive cooling fluid. Each turbine blade may further include a platform section disposed radially upward from a periphery of the disc and the root section. Additionally, an airfoil may extend radially upwardly from the platform section. Each of the turbine blades may include a second, tip end, positioned opposite the first, root end and adjacent a GTE shroud. Throughout this specification reference may be made to portions of a turbine blade that are disposed "radially upward" when referring to portions that are closer to the tip end of the blade than the root end of the blade. Similarly, "radially downward" may refer to portions that are closer to the root end of the blade than the tip end. One of ordinary skill in the art will recognize that the use of these relative positional terms is for purposes of description only, and that the root end of a turbine blade is clearly not always in a position that is "below" the tip end when viewed in a universal frame of reference. The description "radially upward" or "radially upwardly" may also be described as "radially outward" or "radially outwardly", and the description "radially downward" or "radially downwardly" may also be described as "radially inward" or "radially inwardly". Similarly, use of the terms "horizontal" or "vertical" is for description purposes only with reference to the drawings, and is not meant to limit the potential orientations of various features when viewed in a universal frame of reference.

As shown in the exemplary embodiments of FIGS. 1-4, each of the turbine blades includes a leading edge 42, and a trailing edge 44 positioned opposite the leading edge 42. A suction, or convex side 46 and a pressure, or concave side 48 are interposed between the leading edge 42 and the trailing edge 44 of the turbine blade. Each of the blades may have a generally hollow configuration formed by an outer peripheral wall, which, in some embodiments, may have a uniform thickness.

Figure 2:
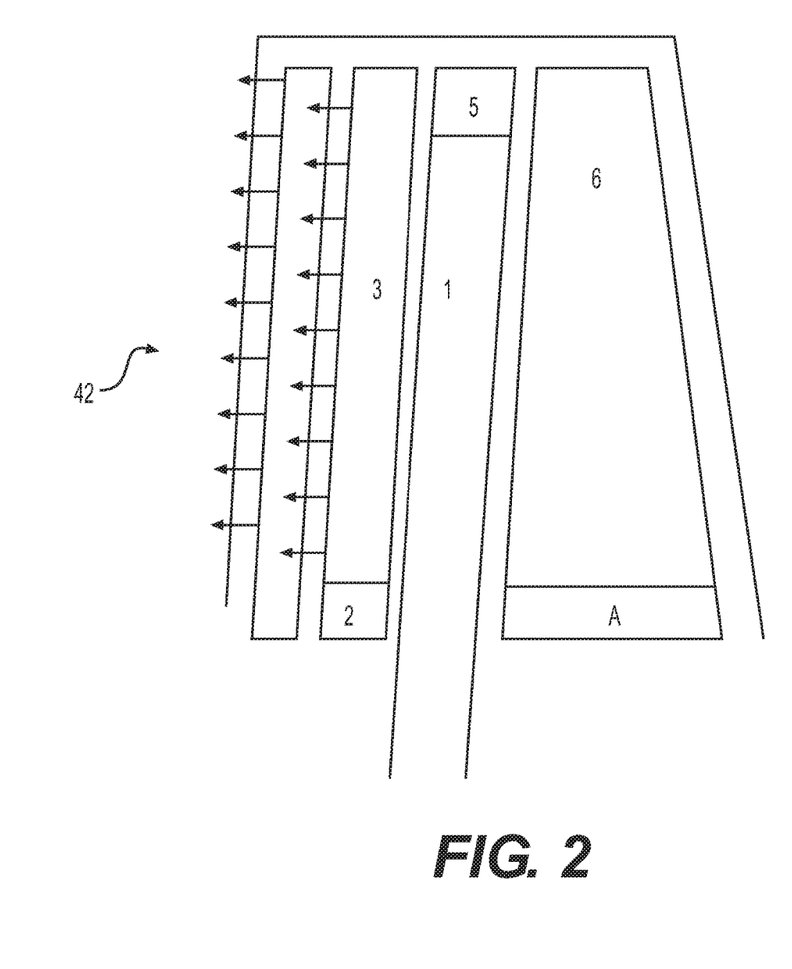
FIG. 2 is a schematic view illustrating fluid interconnections in the turbine blade of FIG. 1.
Figure 3:
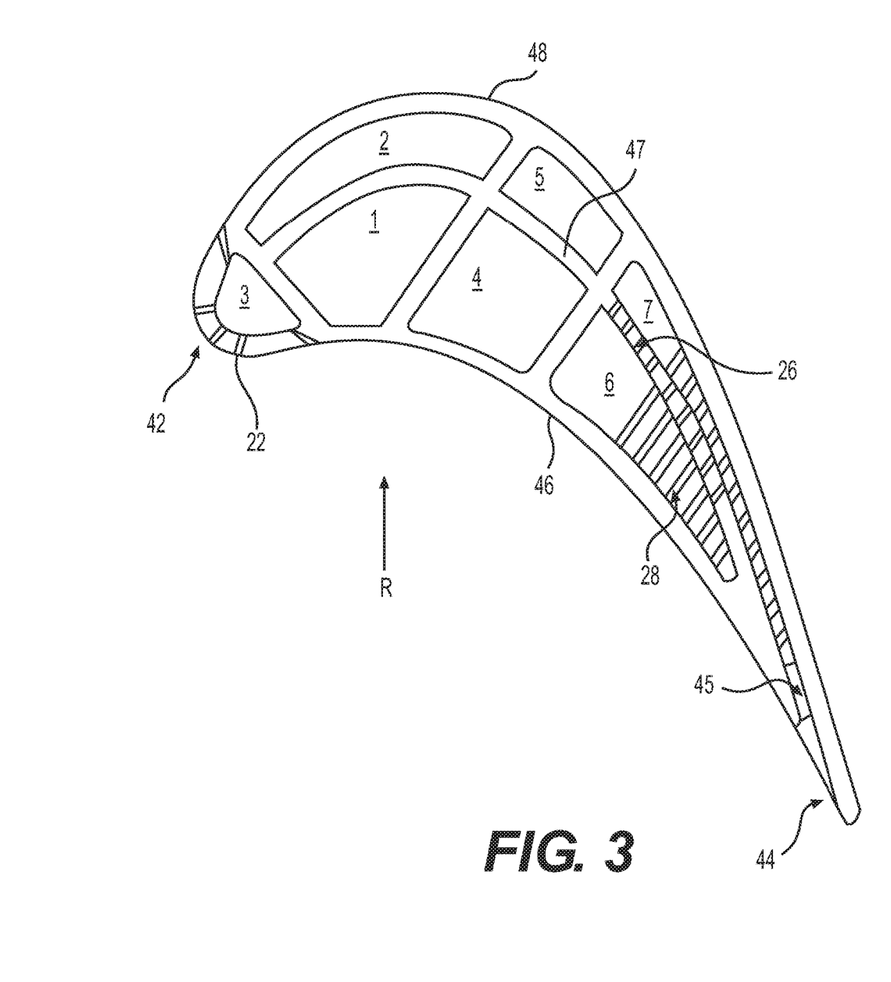
FIG. 3 is a horizontal sectional view of another exemplary embodiment of a turbine blade.
Figure 4:
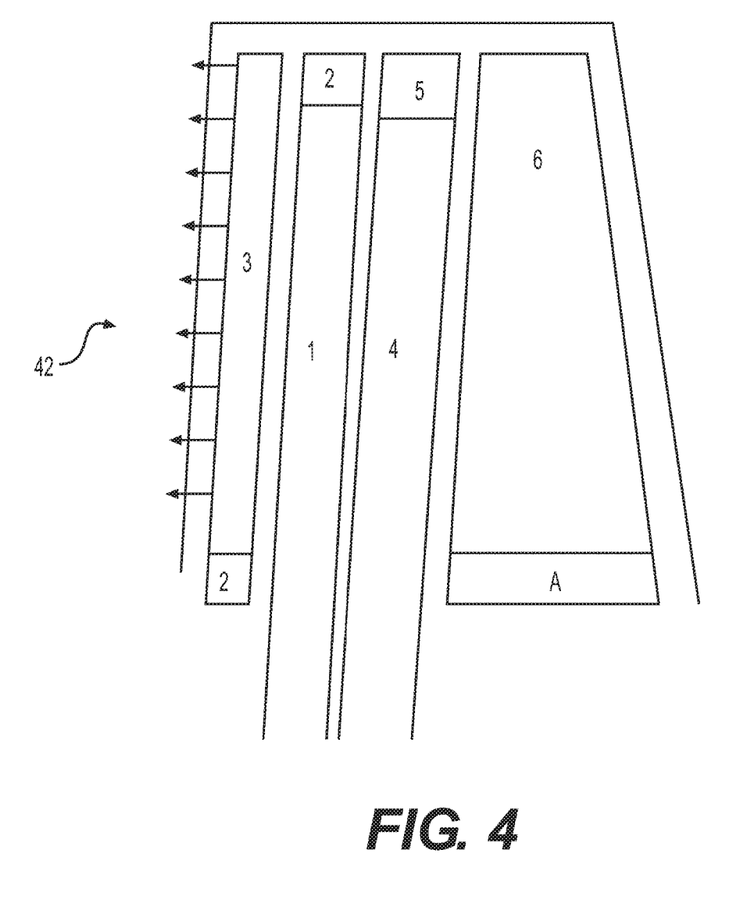
FIG. 4 is a schematic view illustrating fluid interconnections in the turbine blade of FIG. 3.

In the exemplary embodiments of FIGS. 1-4, the turbine blade may include the outer, peripheral wall extending along the suction side 48 and the pressure side 46 of the blade from the leading edge 42 to the trailing edge 44 of the blade, and from a root end to a tip end of the blade. A substantially vertical bifurcating internal wall 47 may be formed to extend between the leading edge and the trailing edge of the blade in between the suction side and the pressure side of the blade. In the embodiment of FIGS. 1 and 2, a plurality of pressure side cooling fluid passages 3, 1, 6, may be defined between the outer peripheral wall on the pressure side 46 of the blade and the bifurcating internal wall 47, and may extend at least part way from the root end to the tip end of the blade. A plurality of suction side cooling fluid passages 2, 5, 7, may be defined between the outer peripheral wall on the suction side 48 of the blade and the bifurcating internal wall 47, and may extend at least part way from the tip end to the root end of the blade. In the embodiment of FIGS. 3 and 4, a plurality of pressure side cooling fluid passages 1, 4, 6 may be defined between the outer peripheral wall of the pressure side 46 of the blade and the bifurcating internal wall 47, and may extend at least part way from the root end to the tip end of the blade. A plurality of suction side cooling fluid passages 2, 5, 7 may be defined between the outer peripheral wall on the suction side 48 of the blade and the bifurcating internal wall 47, and may extend at least part way from the tip end to the root end of the blade.

At least one of the pressure side cooling fluid passages (3, 1, and 6 in the embodiment of FIGS. 1 and 2; and 1, 4, and 6 in the embodiment of FIGS. 3 and 4), may be configured to receive fresh cooling fluid from a cooling fluid inlet opening at the root end of the blade and direct the cooling fluid radially upwardly toward the tip end of the blade. As shown in FIG. 2, in one exemplary embodiment, the tip end of the at least one of the pressure side cooling fluid passages is fluidly connected across a top side of the bifurcating internal wall 47 to at least one of the plurality of suction side cooling fluid passages. In the embodiment shown in FIGS. 1 and 2, fresh cooling fluid from the cooling fluid inlet passes up through only the pressure side cooling fluid passage 1 from the root end to the tip end of the blade. At the tip end of the blade the pressure side cooling fluid passage 1 is connected across the top of the bifurcating internal wall 47 to the tip ends of both of the suction side cooling fluid passages 5 and 2. Cooling fluid may be directed radially upwardly through the pressure side cooling fluid passage 1, across the top of the bifurcating internal wall 47, and then radially downwardly through both suction side cooling fluid passages 5 and 2 from the tip end to the root end of the blade. In the turbine blade embodiment illustrated in FIGS. 1 and 2, only the pressure side cooling fluid passage 1 is configured to receive fresh cooling fluid from the cooling fluid inlet opening at the root end of the blade. In the embodiment illustrated in FIGS. 3 and 4, pressure side cooling fluid passages 1 and 4 are each configured to receive fresh cooling fluid from the cooling fluid inlet opening at the root end of the blade.

The turbine blade internal cooling arrangements in accordance with the various exemplary embodiments of this disclosure are designed to take advantage of the coriolis effect, which enhances the heat transfer from the hotter, outer peripheral wall surfaces along the pressure side 46 and the suction side 48 of the blade when the blade is rotating in the direction R, as shown in FIGS. 1 and 3. The coriolis effect is an inertial force that acts on the cooling fluid as it is in motion relative to the rotating reference frame of each turbine blade mounted on the rotor assembly of the GTE. The coriolis force acting on the cooling fluid flowing through the cooling passages will act in a direction perpendicular to the direction of fluid flow and dependent upon the direction of rotation of the blade. For a clockwise direction of rotation of the turbine blade, the coriolis force will act to the left of the motion of the cooling fluid, and for a counterclockwise direction of rotation, the coriolis force will act to the right of the motion of the cooling fluid.

The bifurcating internal wall 47 divides the internal space within the blade into pressure side passages and suction side passages. When cooling fluid flow is directed radially upwardly from the root end to the tip end of the blade in the pressure side passages as the blade is rotated in the direction R from the pressure side 46 toward the suction side 48, the coriolis effect enhances the contact, and therefore the heat transfer, between the cooling fluid and the inner surfaces of the outside peripheral wall along the pressure side 46. At the same time, when the cooling fluid flow is directed radially downwardly from the tip end to the root end of the blade in the suction side passages as the blade rotates in the direction R, the coriolis effect enhances the contact, and therefore the heat transfer, between the cooling fluid and the inner surfaces of the outside peripheral wall along the suction side 48. As a result, the disclosed internal cooling arrangements result in enhanced cooling of the outer peripheral wall along both the suction side 48 and the pressure side 46 when the turbine blades are operational and are rotating in the direction R from the pressure side 46 toward the suction side 48. The coriolis effect for the cooling arrangements of the present disclosure therefore enhances heat transfer along the hottest outer peripheral wall surfaces while reducing the heat transfer from the cooler bifurcating internal wall. The coriolis force is proportional to the mass of the cooling fluid flowing through the cooling passages, and proportional to the rotation rate of the blades. Therefore, the faster the blades rotate, the greater the coriolis effect, and the greater the enhanced cooling effect along the outer peripheral walls on both the suction sides 48 and the pressure sides 46 of the blades.

In the turbine blade embodiment illustrated in FIGS. 1 and 2, the suction side cooling fluid passage 2 may be configured to direct cooling fluid from the pressure side cooling fluid passage 1 downwardly along the suction side 48 of the blade. The suction side cooling fluid passage 2 may be fluidly connected at the root end of the passage across the bottom side of the bifurcating internal wall 47 to the pressure side cooling fluid passage 3 adjacent a leading edge cooling fluid passage 4 extending vertically along at least a portion of the leading edge 42 of the blade. One or more impingement holes 24 may be provided through an internal wall extending between the pressure side 46 and the suction side 48 of the blade and separating the pressure side cooling fluid passage 3 and the leading edge cooling fluid passage 4. The one or more impingement holes 24 may be configured for directing cooling fluid that is flowing radially upwardly through the pressure side cooling fluid passage 3 into the leading edge cooling fluid passage 4, and impinging that cooling fluid along the inner surface of the outer peripheral wall along the leading edge 42. A showerhead arrangement of film cooling holes 22 may be provided through the outer peripheral wall along the leading edge 42. The film cooling holes 22 may be configured for directing cooling fluid from the leading edge cooling fluid passage 4 to the outer surface of the outer peripheral wall along the leading edge 42 of the blade.

Also in the turbine blade embodiment illustrated in FIGS. 1 and 2, the suction side cooling fluid passage 5 may be configured to direct cooling fluid received at its tip end from the pressure side cooling fluid passage 1 radially downwardly along the suction side 48 of the blade. The suction side cooling fluid passage 5 may also be fluidly connected at its root end across the bottom side of the bifurcating internal wall 47 to the pressure side cooling fluid passage 6 adjacent the trailing edge 44 of the blade. As shown in FIG. 2, the root end of the suction side cooling fluid passage 5 may be fluidly connected with a cavity A that may extend at least partially underneath the suction side cooling fluid passage 7 without actually connecting to the passage 7 before passing underneath the bottom side of the bifurcating internal wall 47 and fluidly connecting with the pressure side cooling fluid passage 6.

After entering the pressure side cooling fluid passage 6 at the root end of the passage 6, the cooling fluid may then flow radially upwardly through the passage 6 from the root end toward the tip end of the passage. One or more impingement holes 26 may be provided through the bifurcating internal wall 47 separating the pressure side cooling fluid passage 6 from the suction side cooling fluid passage 7, which is adjacent the suction side cooling fluid passage 5. The one or more impingement holes 26 through the bifurcating internal wall 47 may be configured for directing cooling fluid that is flowing radially upwardly through the pressure side cooling fluid passage 6 into the suction side cooling fluid passage 7. In this manner, the cooling fluid entering the suction side cooling fluid passage 7 from the pressure side cooling fluid passage 6 may be impinged along the inner surface of the outer peripheral wall on the suction side 48 of the blade. From the suction side cooling fluid passage 7 the cooling fluid may exit the blade trailing edge 44 through pressure side trailing edge discharge slots 45 opening onto the pressure side 46 of the blade. The cooling fluid exiting the trailing edge 44 of the blade may also first pass across a plurality of flow disruptors 28, such as pins, fins, trip-strips, and other turbulators that may further enhance heat transfer from the trailing edge 44.

In the alternative exemplary embodiment illustrated in FIGS. 3 and 4, the cooling arrangement for a turbine blade may include two or more pressure side cooling fluid passages configured to receive fresh cooling fluid from the cooling fluid inlet opening at the root end of the blade. By supplying fresh cooling fluid to two or more pressure side cooling fluid passages, the arrangement disclosed herein may allow for cooling of various regions of the turbine blade depending on the different temperatures those regions are exposed to, while enabling reductions in the amount of cooling fluid that must be diverted from the compressor of the GTE, thereby also increasing the efficiency of the GTE. As shown in FIG. 4, adjacent first and second pressure side cooling fluid passages 1 and 4 may be configured to each receive fresh cooling fluid from the cooling fluid inlet opening at the root end of the blade. Each of the pressure side cooling fluid passages 1 and 4 may be fluidly connected across the top side of the bifurcating internal wall 47 to the tip ends of adjacent suction side cooling fluid passages 2 and 5, respectively. The suction side cooling fluid passage 2 may be configured to direct cooling fluid from the pressure side cooling fluid passage 1 radially downwardly along the suction side 48 of the blade. The suction side cooling fluid passage 2 may be fluidly connected at its root end across the bottom side of the bifurcating internal wall 47 to a leading edge cooling fluid passage 3 extending vertically along at least a portion of the leading edge 42 of the blade. Cooling fluid entering the leading edge cooling fluid passage 3 from the root end of the suction side cooling fluid passage 2 may flow radially upwardly from the root end of the leading edge cooling fluid passage 3 toward the tip end of the passage. A showerhead arrangement of film cooling holes 22 may be provided through the outer peripheral wall along the leading edge 42. The film cooling holes 22 may be configured for directing cooling fluid from the leading edge cooling fluid passage 3 to the outer surface of the outer peripheral wall along the leading edge 42 of the blade.

In the embodiment of FIGS. 3 and 4, the suction side cooling fluid passage 5 may be configured to receive cooling fluid at its tip end from the tip end of the pressure side cooling fluid passage 4. The suction side cooling fluid passage 5 may also be configured to direct cooling fluid received from the pressure side cooling fluid passage 4 downwardly along the suction side 48 of the blade. The root end of the suction side cooling fluid passage 5 may be fluidly connected across the bottom side of the bifurcating internal wall 47 to the pressure side cooling fluid passage 6 adjacent the trailing edge 44 of the blade. As shown in FIG. 4, the root end of the suction side cooling fluid passage 5 may be fluidly connected with a cavity A that may extend at least partially underneath the suction side cooling fluid passage 7 without actually connecting to the passage 7 before passing underneath the bottom side of the bifurcating internal wall 47 and fluidly connecting with the pressure side cooling fluid passage 6.

After entering the pressure side cooling fluid passage 6 at the root end of the passage 6, the cooling fluid may then flow radially upwardly through the passage 6 from the root end toward the tip end of the passage. One or more impingement holes 26 may be provided through the bifurcating internal wall 47 separating the pressure side cooling fluid passage 6 from the suction side cooling fluid passage 7, which is adjacent the suction side cooling fluid passage 5. The one or more impingement holes 26 through the bifurcating internal wall 47 may be configured for directing cooling fluid that is flowing radially upwardly through the pressure side cooling fluid passage 6 into the suction side cooling fluid passage 7. In this manner, the cooling fluid entering the suction side cooling fluid passage 7 from the pressure side cooling fluid passage 6 may be impinged along the inner surface of the outer peripheral wall on the suction side 48 of the blade.

From the suction side cooling fluid passage 7 the cooling fluid may exit the blade trailing edge 44 through pressure side trailing edge discharge slots 45 opening onto the pressure side 46 of the blade. The cooling fluid exiting the trailing edge 44 of the blade may also first pass across a plurality of flow disruptors 28, such as pins, fins, trip-strips, and other turbulators that may further enhance heat transfer from the trailing edge 44.

Additional turbulators or flow disruptors in the form of trip-strips may be arranged in various configurations, orientations, and densities of spacing within the pressure side and suction side internal cooling passages. The trip-strips or other turbulators or flow disruptors may be disposed along the inner surface of the outer peripheral wall in each of the passages, and may be configured to produce a turbulent fluid flow within the passages for improved heat transfer. In some embodiments, the flow disruptors may be formed integrally with the outer peripheral wall. The trip-strips may have any cross-section, length, or orientation within each passage depending on a desired amount of turbulence to be created in the cooling fluid flow. In some embodiments, the trip-strips may be a plurality of broken ribs arranged on the inner surface of the outer peripheral wall at different angles within the passages. In other embodiments, the flow disruptors may take the form of one or more concave cavities, or dimples in the peripheral wall and/or one or more convex protrusions formed on the inner surface of the outer peripheral wall.

The aforementioned description of various internal cooling arrangements for turbine blades may be typical of one or more of the turbine stages within the turbine section of a GTE where cooling may be employed. One of ordinary skill in the art will recognize that the number of pressure side and suction side cooling passages on opposite sides of the bifurcating internal wall 47 may be varied. Moreover, the fluid interconnections across the top side and the bottom side of the bifurcating internal wall between adjacent pressure side and suction side cooling passages may vary depending on cooling needs for a particular airfoil.

INDUSTRIAL APPLICABILITY

The above-mentioned apparatus, while being described as an apparatus for cooling a turbine blade, can be applied to any other blade or airfoil requiring temperature regulation. For example, turbine nozzles in a GTE could incorporate the cooling apparatus described above. Moreover, the disclosed cooling apparatus is not limited to GTE industry application. The above-described principal, that is, using a bifurcating internal wall that separates the internal cavity of an airfoil into pressure side and suction side cooling passages, may be applied to other applications and industries requiring temperature regulation of a working component. The disclosed cooling arrangements may be configured to direct cooling fluid upwardly from a root end toward a tip end of one or more pressure side cooling passages and downwardly from a tip end to a root end of one or more suction side cooling passages. As a result, when the turbine blade rotates in a direction from the pressure side to the suction side, the coriolis effect results in enhanced cooling of the hottest areas of the blade along the outer peripheral wall surfaces on both the pressure side and the suction side.

A portion of the compressed fluid from the compressor section of the GTE is bled from the compressor section and forms the cooling fluid used to cool the turbine blades at different stages of the turbine section of the GTE. The compressed cooling fluid exits the compressor section, flows through an internal passage of a combustor discharge plenum, and enters into a portion of the fluid flow channel as cooling fluid. The flow of cooling fluid is used to cool and prevent ingestion of hot gases into the internal components of the GTE. For example, the air bled from the compressor section flows into a compressor discharge plenum, through spaces between a plurality of combustion chambers, and into the fluid flow channel in the support structure of each rotor assembly. After passing through the fluid flow channel, the cooling fluid enters the cooling fluid inlet opening between the first, root end of the turbine blade and the bottom of the root retention slot in the disc of each rotor assembly. The cooling fluid inlet opening is fluidly connected to the one or more pressure side cooling fluid passages in the interior of the turbine blade.

In a method of cooling a turbine blade in accordance with various implementations of this disclosure, cooling fluid may be directed from a cooling fluid inlet opening at the root end of the blade up through at least one of the pressure side cooling fluid passages toward the tip end of the blade, across the top of the bifurcating internal wall from the tip end of the at least one pressure side cooling fluid passage to the tip end of at least one suction side cooling fluid passage, and then radially downwardly through the at least one suction side cooling fluid passage from the tip end of the blade toward the root end of the blade. In some implementations only a first one of the at least one pressure side cooling fluid passages receives cooling fluid from the cooling fluid inlet opening at the root end of the blade. In other alternative implementations two or more of the pressure side cooling fluid passages may receive cooling fluid from the cooling fluid inlet opening. The cooling fluid may be directed from the tip end of the at least one pressure side cooling fluid passages across the top side of the bifurcating internal wall to two of the suction side cooling fluid passages.

Cooling fluid may be directed from the first one of the pressure side cooling fluid passages downwardly through a first one of the suction side cooling fluid passages and across the bottom side of the bifurcating internal wall to a second one of the pressure side cooling fluid passages adjacent a leading edge cooling fluid passage extending vertically along at least a portion of the leading edge of the blade. The cooling fluid may flow upwardly through the second pressure side cooling fluid passage and through one or more impingement holes in an internal wall extending between the pressure side and the suction side and separating the second pressure side cooling fluid passage and the leading edge cooling fluid passage. After impinging on the internal surfaces of the outer peripheral wall in the leading edge cooling fluid passage, the cooling fluid may be discharged from the leading edge cooling fluid passage through a showerhead arrangement of film cooling holes provided through the outer peripheral wall along the leading edge to the outer surface of the outer peripheral wall along the leading edge of the blade.

Cooling fluid may also be directed from the first one of the pressure side cooling fluid passages downwardly through a second one of the suction side cooling fluid passages along the suction side of the blade, and across the bottom side of the bifurcating internal wall to a third one of the pressure side cooling fluid passages adjacent the trailing edge of the blade. The cooling fluid may then flow through one or more impingement holes provided through the bifurcating internal wall separating the third one of the pressure side cooling fluid passages from a third suction side cooling fluid passage adjacent the second one of the two suction side cooling fluid passages. The one or more impingement holes through the bifurcating internal wall may direct cooling fluid flowing upwardly through the third pressure side cooling fluid passage into the third suction side cooling fluid passage.

In alternative implementations of this disclosure, cooling fluid may be directed from the cooling fluid inlet opening at the root end of one or more turbine blades up through first and second pressure side cooling fluid passages toward the tip end of each blade. Cooling fluid may be directed from the first pressure side cooling fluid passage across the top side of the bifurcating internal wall to a first suction side cooling fluid passage, downwardly along the suction side of the blade, and across the bottom side of the bifurcating internal wall to a leading edge cooling fluid passage extending vertically along at least a portion of the leading edge of the blade. Cooling fluid from the second pressure side cooling fluid passage may be directed across the top side of the bifurcating internal wall to a second suction side cooling fluid passage, downwardly along the suction side of the blade, and across the bottom side of the bifurcating internal wall to a third one of the pressure side cooling fluid passages adjacent the trailing edge of the blade.

In some instances, the turbine blades may be manufactured by a known casting process, for example investment casting. During investment casting, the blades can be formed having the bifurcating internal wall 47 extending between the leading edge 42 and the trailing edge 44 and defining a separation between one or more pressure side cooling fluid passages and one or more suction side cooling fluid passages. Investment casting the turbine blade may form the bifurcating internal wall 47 at the time of casting. Additional internal walls may be formed extending between the pressure side 46 and the suction side 48, which in conjunction with the bifurcating internal wall 47 define the plurality of pressure side and suction side cooling fluid passages. In some instances, the casting material for the blade 22, and therefore also for the internal walls, may be metal. In some cases, the turbine blade may be cast as a single crystal, or monocrystalline solid, and may be made of a superalloy.

Typical arrangements for directing fluid through a turbine blade include passages extending through an interior of the blade. While the passages generally include one or more turns or corners through which the fluid is directed, these turns can cause undesired pressure losses. The turns and corners are susceptible to flow separation, that is, deadzones or vacant space in a flow path without fluid flow. In addition to pressure losses, using larger passages for cooling can also result in flow separation from the increased cross sectional area of the passages. When the fluid flows at a high velocity through the passages, there is often insufficient time for flow expansion or diffusion, which results in flow separation, or chaos, within the turbine blade. When the flow of cooling fluid separates within the passages, the cooling fluid does not fill the space of the passages, and therefore the heat transfer coefficient may decrease. With a decrease in the heat transfer coefficient, there is a risk of overheating and problems related to premature wear of the turbine blades, which can prevent overall efficient operation of the GTE.

The above-described apparatus provides more efficient use of the cooling air bled from the compressor section of a GTE in order to facilitate increased component life and efficiency of the GTE. The division of the internal cavity of the turbine blade into pressure side and suction side cooling fluid passages, and the configuration of the passages that allows cooling fluid to flow upwardly along the pressure side cooling fluid passages and downwardly along the suction side cooling fluid passages, results in rotation enhanced cooling as discussed above. The flow of cooling fluid through the internal cooling arrangements of the various exemplary embodiments disclosed herein takes advantage of the coriolis effect to ensure good contact between the cooling fluid and the internal surfaces of the outer peripheral wall on both the pressure side and the suction side of the blade. The resulting reduction in any flow separation between the cooling fluid flow and the hottest surfaces of the blade increases the heat transfer coefficient and causes more effective cooling of the turbine blade. This enhanced cooling reduces the temperature of the metal of the blade, hence reducing the stresses imparted on the blade and increasing the blade service life. Increasing the blade service life allows the turbine blades to be used for longer periods, thus reducing the frequency of necessary turbine section inspections for a given GTE.

It will be apparent to those skilled in the art that various modifications and variations can be made to the disclosed turbine cooling system. Other embodiments will be apparent to those skilled in the art from consideration of the specification and practice of the disclosed system and method. It is intended that the specification and examples be considered as exemplary only, with a true scope being indicated by the following claims and their equivalents.

What is claimed is:

1. A turbine blade for a gas turbine engine, comprising:
   an outer, peripheral wall extending along a suction side and a pressure side of the blade from a leading edge to a trailing edge of the blade and from a root end to a tip end of the blade;
   a substantially vertical bifurcating internal wall extending between the leading edge and the trailing edge of the blade in between the suction side and the pressure side of the blade;
   a plurality of pressure side cooling fluid passages defined between the peripheral wall on the pressure side of the blade and the bifurcating internal wall and extending at least part way from the root end to the tip end of the blade;
   a plurality of suction side cooling fluid passages defined between the peripheral wall on the suction side of the blade and the bifurcating internal wall and extending at least part way from the tip end to the root end of the blade; and
   at least one of the pressure side cooling fluid passages being configured to receive fresh cooling fluid from a cooling fluid inlet opening at the root end of the blade and direct the cooling fluid radially upwardly toward the tip end of the blade, wherein the tip end of the at least one of the pressure side cooling fluid passages is fluidly connected across a top side of the bifurcating internal wall to at least one of the plurality of suction side cooling fluid passages such that cooling fluid passes up through the at least one pressure side cooling fluid passages from the root end to the tip end of the blade, across the top of the bifurcating internal wall, and down through the at least one suction side cooling passage from the tip end to the root end of the blade,
   wherein only a first one of the at least one of the pressure side cooling fluid passages is configured to receive cooling fluid from the cooling fluid inlet opening at the root end of the blade, the first one of the pressure side cooling fluid passages being fluidly connected across the top side of the bifurcating internal wall to two of the suction side cooling fluid passages,
   wherein one of the two suction side cooling fluid passages is configured to direct cooling fluid from the first one of the pressure side cooling fluid passages downwardly along the suction side of the blade and is fluidly connected across the bottom side of the bifurcating internal wall to a second one of the pressure side cooling fluid passages adjacent a leading edge cooling fluid passage extending vertically along at least a portion of the leading edge of the blade; and
   wherein one or more impingement holes are provided through an internal wall extending between the pressure side and the suction side of the blade and separating the second one of the pressure side cooling fluid passages and the leading edge cooling fluid passage, the one or more impingement holes configured for directing cooling fluid flowing upwardly through the second one of the pressure side cooling fluid passages into the leading edge cooling fluid passage, and a showerhead arrangement of film cooling holes being provided through the outer peripheral wall along the leading edge and configured for directing cooling fluid from the leading edge cooling fluid passage to the outer surface of the outer peripheral wall along the leading edge of the blade.

2. The turbine blade of claim 1, wherein a second one of the two suction side cooling fluid passages is configured to direct cooling fluid from the first one of the pressure side cooling fluid passages downwardly along the suction side of the blade, and is fluidly connected across the bottom side of the bifurcating internal wall to a third one of the pressure side cooling fluid passages adjacent the trailing edge of the blade; and
   wherein one or more impingement holes are provided through the bifurcating internal wall separating the third one of the pressure side cooling fluid passages from a third suction side cooling fluid passage adjacent the second suction side cooling fluid passage, the one or more impingement holes through the bifurcating internal wall being configured for directing cooling fluid flowing upwardly through the third pressure side cooling fluid passage into the third suction side cooling fluid passage.

3. A method of cooling a turbine blade, wherein the turbine blade comprises an outer, peripheral wall extending along a suction side and a pressure side of the blade from a leading edge to a trailing edge of the blade and from a root end to a tip end of the blade, a substantially vertical bifurcating internal wall extending between the leading edge and the trailing edge of the blade in between the suction side and the pressure side of the blade, a plurality of pressure side cooling fluid passages defined between the peripheral wall on the pressure side of the blade and the bifurcating internal wall and extending at least part way from the root end to the tip end of the blade, and a plurality of suction side cooling fluid passages defined between the peripheral wall on the suction side of the blade and the bifurcating internal wall and extending at least part way from the tip end to the root end of the blade, the method comprising:
   directing cooling fluid from a cooling fluid inlet opening at the root end of the blade up through at least one of the pressure side cooling fluid passages toward the tip end of the blade;
   directing the cooling fluid across the top of the bifurcating internal wall from the tip end of the at least one pressure side cooling fluid passage to the tip end of at least one suction side cooling fluid passage; and
   directing the cooling fluid through the at least one suction side cooling fluid passage from the tip end of the blade toward the root end of the blade, wherein only a first one of the at least one pressure side cooling fluid passages receives cooling fluid from the cooling fluid inlet opening at the root end of the blade, wherein the cooling fluid is directed from the tip end of the first one of the at least one pressure side cooling fluid passages across the top side of the bifurcating internal wall to two of the suction side cooling fluid passages, further including directing cooling fluid from the first one of the pressure side cooling fluid passages downwardly through a first one of the two suction side cooling fluid passages and across the bottom side of the bifurcating internal wall to a second one of the pressure side cooling fluid passages adjacent a leading edge cooling fluid passage extending vertically along at least a portion of the leading edge of the blade;

directing the cooling fluid flowing upwardly through the second pressure side cooling fluid passage through one or more impingement holes in an internal wall extending between the pressure side and the suction side and separating the second pressure side cooling fluid passage and the leading edge cooling fluid passage; and directing cooling fluid from the leading edge cooling fluid passage through a showerhead arrangement of film cooling holes provided through the outer peripheral wall along the leading edge to the outer surface of the outer peripheral wall along the leading edge of the blade.

4. A method of cooling a turbine blade, wherein the turbine blade comprises an outer, peripheral wall extending along a suction side and a pressure side of the blade from a leading edge to a trailing edge of the blade and from a root end to a tip end of the blade, a substantially vertical bifurcating internal wall extending between the leading edge and the trailing edge of the blade in between the suction side and the pressure side of the blade, a plurality of pressure side cooling fluid passages defined between the peripheral wall on the pressure side of the blade and the bifurcating internal wall and extending at least part way from the root end to the tip end of the blade, and a plurality of suction side cooling fluid passages defined between the peripheral wall on the suction side of the blade and the bifurcating internal wall and extending at least part way from the tip end to the root end of the blade, the method comprising:

directing cooling fluid from a cooling fluid inlet opening at the root end of the blade up through at least one of the pressure side cooling fluid passages toward the tip end of the blade;

directing the cooling fluid across the top of the bifurcating internal wall from the tip end of the at least one pressure side cooling fluid passage to the tip end of at least one suction side cooling fluid passage; and directing the cooling fluid through the at least one suction side cooling fluid passage from the tip end of the blade toward the root end of the blade, wherein only a first one of the at least one pressure side cooling fluid passages receives cooling fluid from the cooling fluid inlet opening at the root end of the blade, wherein the cooling fluid is directed from the tip end of the first one of the at least one pressure side cooling fluid passages across the top side of the bifurcating internal wall to two of the suction side cooling fluid passages, further including directing cooling fluid from the first one of the pressure side cooling fluid passages downwardly through a second one of the two suction side cooling fluid passages along the suction side of the blade, and across the bottom side of the bifurcating internal wall to a third one of the pressure side cooling fluid passages adjacent the trailing edge of the blade; and wherein one or more impingement holes are provided through the bifurcating internal wall separating the third one of the pressure side cooling fluid passages from a third suction side cooling fluid passage adjacent the second one of the two suction side cooling fluid passages, the one or more impingement holes through the bifurcating internal wall being configured for directing cooling fluid flowing upwardly through the third pressure side cooling fluid passage into the third suction side cooling fluid passage.

* * * * *